Oct. 5, 1965    C. W. JACOB    3,210,757
MATRIX CONTROLLED LIGHT VALVE DISPLAY APPARATUS
Filed Jan. 29, 1962    4 Sheets-Sheet 1

INVENTOR.
CARLYLE W. JACOB
BY
Weingarten, Crenbuch & Pandiscio
ATTORNEYS

Oct. 5, 1965   C. W. JACOB   3,210,757
MATRIX CONTROLLED LIGHT VALVE DISPLAY APPARATUS
Filed Jan. 29, 1962   4 Sheets-Sheet 2
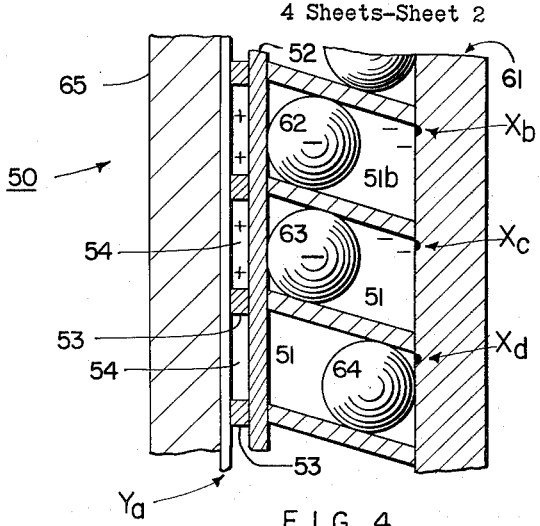
FIG. 4
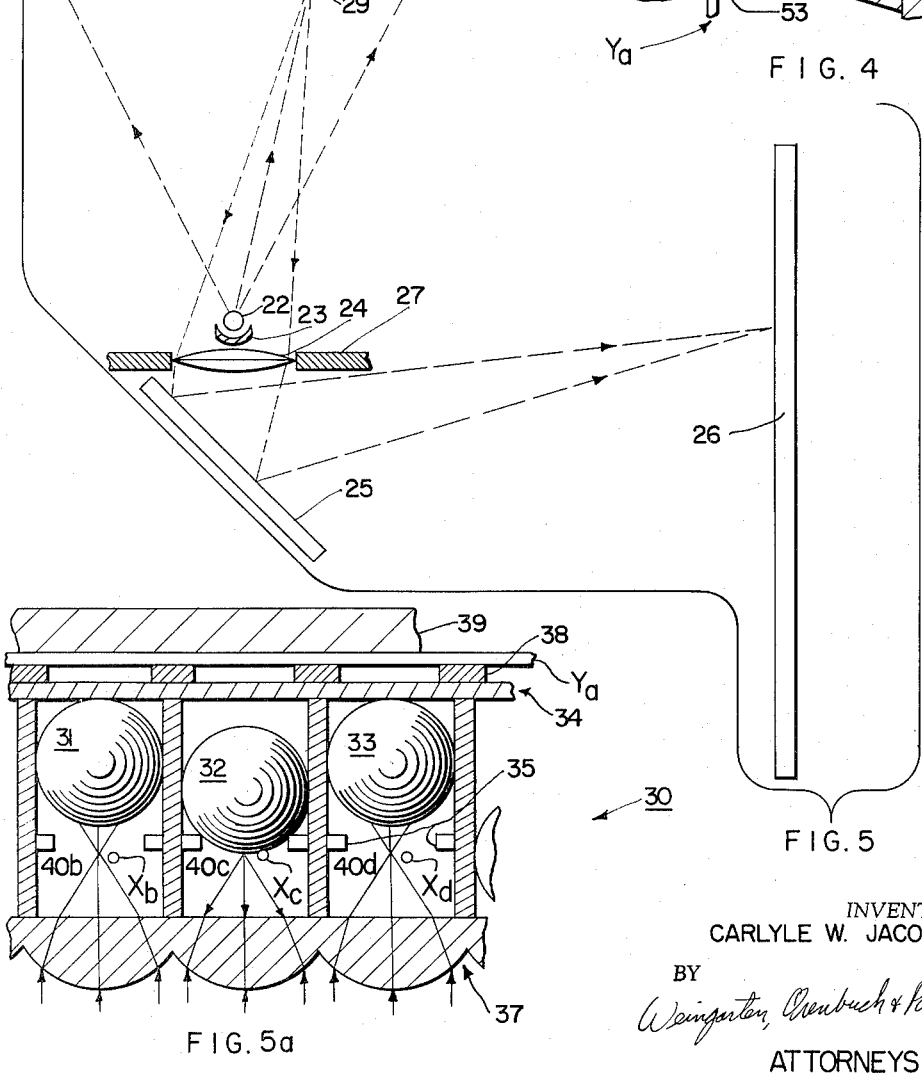
FIG. 5
FIG. 5a
INVENTOR.
CARLYLE W. JACOB
BY
Weingarten, Orenbuch & Pandiscio
ATTORNEYS Oct. 5, 1965 C. W. JACOB 3,210,757
MATRIX CONTROLLED LIGHT VALVE DISPLAY APPARATUS
Filed Jan. 29, 1962 4 Sheets-Sheet 3

INVENTOR.
CARLYLE W. JACOB
BY
Weingarten, Ozenbuch & Pardivis
ATTORNEYS

Oct. 5, 1965

C. W. JACOB 3,210,757

MATRIX CONTROLLED LIGHT VALVE DISPLAY APPARATUS

Filed Jan. 29, 1962

INVENTOR.
CARLYLE W. JACOB
BY
Weingarten, Chenbuch & Pandiscio

ATTORNEYS

United States Patent Office 3,210,757
Patented Oct. 5, 1965

3,210,757
MATRIX CONTROLLED LIGHT VALVE DISPLAY APPARATUS
Carlyle W. Jacob, 120 Babcock St., Brookline, Mass.
Filed Jan. 29, 1962, Ser. No. 170,310
15 Claims. (Cl. 340—373)

This invention relates in general to display apparatus for transforming electrical signals representing graphic information or other intelligence into images visible on a viewing screen. More particularly, the invention pertains to a device having a matrix of electrostatically or magnetically controlled light gating elements forming a panel on which bright visual images can rapidly be displayed.

In my copending application, Serial No. 103,938, filed April 18, 1961, there is described a display system having a viewing panel which is illuminated by a source of light. The panel is provided with an electrically insulative surface for retaining a pattern of electric charges. The opposite surface of the panel has an electrically conductive layer which is connected to a reference potential source, usually ground. An electric charge emitting head assembly, having a large number of electrodes, whose tips are adjacent to the panel's insulative surface, is made to traverse the insulative surface and deposit electric charges on it to form an electrical charge pattern thereon representing the image to be displayed. The electric field established between this electric charge pattern and the conductive layer control light gating elements.

The system described in the aforesaid copending application requires a writing and erasing head assembly comprising a plurality of electric charge emitting heads, each head being connected to a distributor of high voltage. The head assembly is mounted on a carriage and the carriage is made to move by driving means so that the head assembly traverses the rear surface of the panel. The rate at which information is written on the panel depends upon the time required for the carriage to move the head assembly over the panel's insulative rear surface. Where it is desired to quickly write or change the information on the viewing panel, severe limitations are imposed by the carriage because of its inertia. Moreover, in the system described in my copending application, unwanted charges tend to accumulate on the insulative surface.

The primary object of the present invention is to provide simplified display apparatus for converting electric signals into an electrostatic charge pattern controlling light gating elements. Simplification is achieved by employing crossed arrays of stationary charge depositing electrodes, rather than a carriage carrying a head assembly. An inherent advantage of the invention over the apparatus described in the aforesaid copending application is that the static charge pattern is rapidly produced on the charge receiving surfaces and can be rapidly erased either totally or selectively.

Another object of the present invention is to provide an embodiment of the invention in which a charge pattern is retained by the display panel for only a short period of time but the visible image produced by the charge pattern is retained until written over or erased.

Another object is to provide an embodiment of the invention employing both magnetic means and electrostatic means to control the light gating elements in the panel.

Another object of the invention is to provide apparatus arranged whereby the image on the display panel is projected onto a screen and appears on the screen with high luminous intensity.

The invention resides in a display system having a viewing panel which is illuminated by a source of light. The panel is provided with a surface capable of retaining a pattern of electric charges. Two orthogonal stationary sets of signal wires traverse the charge retaining surface, and are made to deposit electric charges on it representing the image to be displayed. The individual wires in one set of wires are selectively energized by positive polarity signal voltage pulses while the individual wires in the second set of wires are selectively energized by negative polarity signal voltage pulses. At the crossover point of two energized wires the resultant electric field is strong enough to deposit electric charges on the adjacent charge retaining surface. A matrix of light valves is disposed parallel and close to the charge retaining surface so that the valves are under the influence of the electric field created by the deposited charges. The light valves are constructed so that a relatively strong electric field causes the valves to be in one condition, whereas the absence of an electric field or a weak or reversely polarized electric field causes the valves to be in the opposite condition. The individual light valves may be constructed in the various forms disclosed in my aforesaid copending application or in the improved versions thereof discussed herein. In one embodiment of the invention, the light valves, when in one condition, permit the passage of light through the cell and in the opposite condition block light transmission. In another form of the invention the light valves control the reflection of light from the panel. In a modified form of the invention the light valves include means for the focusing and defocusing of light striking the valves, producing thereby a new and useful type of light valving action. In still another embodiment, magnetic means are employed as detents to retain the valves in position should the electrostatic charges leak off. Magnetic means are also employed as the sole means for putting the valves in at least one condition.

The display panel of the present invention has many uses. In its simplest form, the display panel may be used to transform intelligence transmitted in the form of electrical signals into visual signals. These visual signals may appear as points of light or simply as small spots or areas having a different coefficient of reflection than the surrounding areas. The location of these spots on the panel corresponds to the electrical signals received. In their simplest form, my panels replace a small two dimensional array of indicator light bulbs on a board in which the energizing or deenergizing of a particular bulb on the board imparts certain information to an observer. In a slightly more complex form, my panels can be designed to display an entire character or symbol like a traffic light symbol which can be made to appear and disappear. The more intricate embodiments of the display panel of the present invention may be used for the production of large, bright, highly complex, live displays including strategic military displays in which symbols, characters, entire maps or any other information is quickly formed on the panel and equally as quickly erased either in whole or in part and immediately replaced by new, fresh visual information.

The invention, both as to its construction and mode of operation can be better understood by a perusal of the following exposition when considered with the accompanying drawings in which.

FIG. 4 shows in coss-section a display panel embodied as a species of the invention;

FIG. 5 illustrates a projection system employing a display panel;

FIG. 5a depicts the cross-section of a display panel employing a lenticular plate for bringing light to a focus within the cell;

Figure 1:
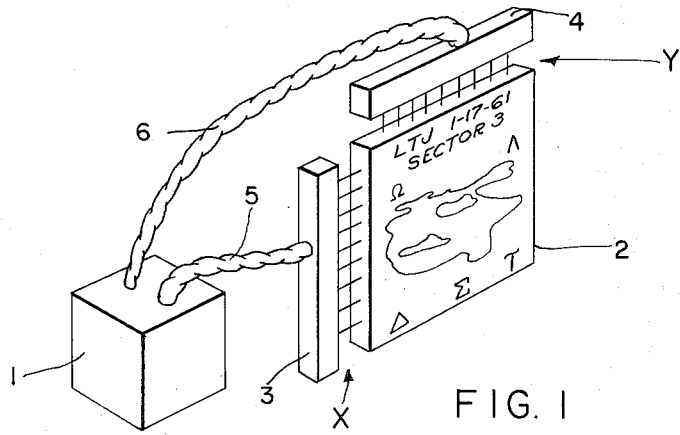
FIG. 1 depicts a general arrangement employing a display panel constructed in accordance with the invention.

Referring now to FIG. 1, there is depicted a display system comprising a signal source 1 for generating the electrical signals which determine the information appearing on a display panel 2. The information may be pictorial, such as a map; it may be symbols, such as letters of the alphabet; or it may be a mixture of pictures and symbols. Unseen by the viewer of the display panel is a mesh or grid of fine electrically conductive wires running through the panel. One set of parallel wires, designated the X wires, extends from a distributor box 3. A second set of parallel wires, extending from a distributor box 4, is designated the Y wires and is disposed orthogonally to the X set so that both sets form a grid. It should be understood that the X wires do not touch the Y wires. Signals from source 1 are brought to the distributor boxes 3 and 4 by cables 5 and 6 respectively.

The resolution of the information appearing on display panel 2 depends upon the number of X and Y wires employed per unit area of display surface. In FIG. 1, nine X wires are depicted extending horizontally and nine Y wires are depicted extending vertically into the display panel. For ease of reference to individual wires, the X wires from top to bottom, are designated in consecutive order by the subscripts $a$ to $i$. Thus the uppermost horizontal wire is designated $Xa$ and the lowermost is designated $Xi$. Similarly the Y wires, from left to right are designated consecutively by subscripts $a$ to $i$. Obviously, the actual number of wires per unit area used in a display panel is variable and depends upon the resolution, that is the amount of detail or sharpness of the image, which is wanted.

In most situations the display panel would be disposed vertically for viewing and so it is assumed that the vertical disposition is the "normal" arrangement. It should be recognized, however, that many situations arise where a horizontal disposition of display panel is better suited to viewing requirements. For example, the viewing panel may be the top of a large table in a room having a balcony from which the viewer may look down upon the scene depicted on the panel. This sort of arrangement has been used by military commanders who desire a synthetic view of their area of command. A second example of where the display panel would be mounted horizontally is depicted in FIG. 5. In that figure the panel is seen from below by a projection system which casts the image onto a vertical screen.

Figure 2:
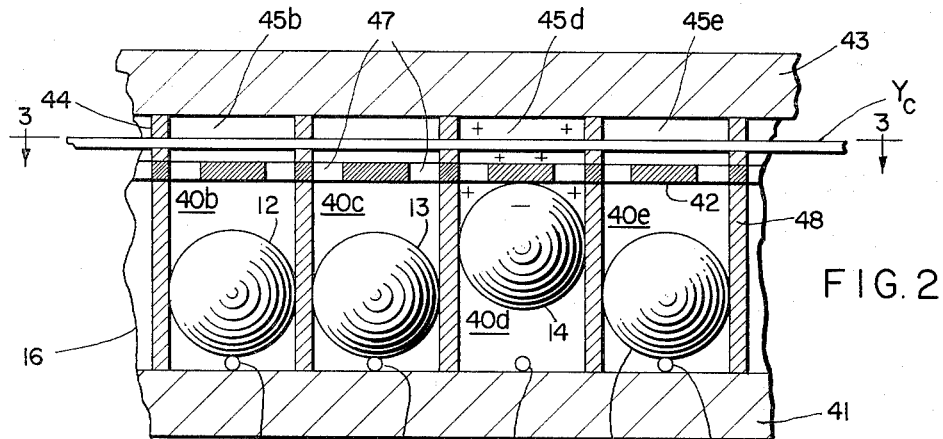
FIG. 2 is a cross-sectional view of one embodiment of the display panel employing balls as shutter elements.

One type of display panel intended for horizontal mounting is depicted in cross-section in FIG. 2. The wires $Xb$, $Xc$, $Xd$, etc., correspond to the X wires of FIG. 1 and the $Yc$ wire corresponds to one of the wires in the Y set of FIG. 1. The display panel of FIG. 2 is a structure resembling somewhat the honeycomb of a beehive.

Figure 3:
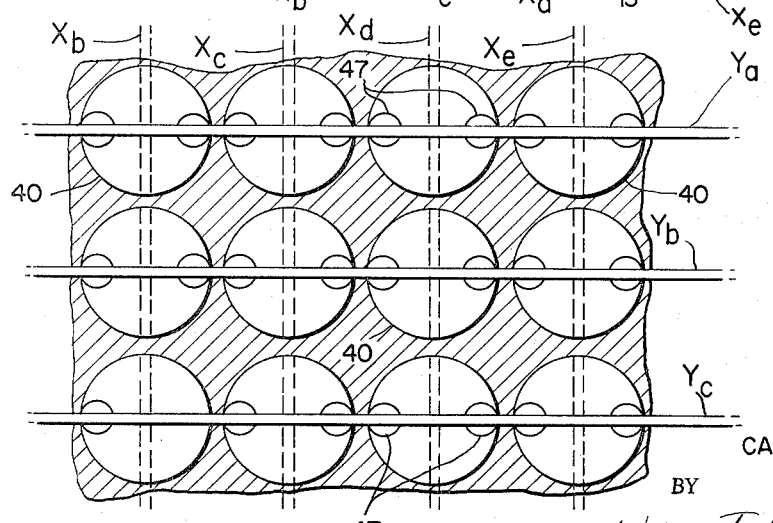
FIG. 3 is a top view of the display panel showing the arrangement of cells in relation to the orthogonal X and Y wires.

The display panel comprises an insulative honeycomb sheet 16 containing cells 40($b$–$e$) separated by walls 48. Within the cells are shutter balls 12, 13, 14, and 15. When the balls are in their lower position, as indicated by balls 12, 13, and 15 in FIG. 2, they can be readily seen through a transparent plate 41 of glass or plastic attached to the underside of the honeycomb sheet. However, when the balls are in the upper retracted position, as indicated by ball 14, the ball is shaded by the cellular walls 48 and cannot be readily seen. Bounding the honeycomb sheet on its upper side is a charge retaining cover sheet 42 capable of retaining an electrical charge. This electrical charge is deposited on the cover sheet 42 by a flow of ions from the Y wires. When, for example, a high electric potential is impressed between wires $Yc$ and $Xd$, wire $Yc$ gives off an ionic discharge, sometimes termed a corona discharge. In order to add structural support to the matrix of cells and to confine the electrical discharge from the Y wires, an outer electrically insulative cover plate 43 is attached to the display panel by means of an insulative structural support member 44 containing cylindrical holes or cavities 45 that are centered over the cells 40$b$, 40$c$, 40$d$, 40$e$. In addition, a plurality of small holes are laterally cut into the member 44 through which the Y wires are threaded. The support member 44 has the function of forming confining chambers 45 which prevent the ionic discharge given off by that portion of wire $Yc$ over cell 40$d$ from spreading to the adjacent cells. The cover sheet 42 has perforations which permit the ionic discharge to pass down from chamber 45 into the cell below. As a matter of convenience, each cell as shown in FIG. 3, communicates with the chamber above through two circular perforations 47 in the cover sheet. Assuming positively charged ions to be given off by wire $Yc$ in chamber 45$d$, those ions pass through the perforations 47 in cover sheet 42 and enter cell 40$d$.

The chambers 45 ($b$ through $e$ are shown), as illustrated in FIG. 2, have the same diameter as the cells beneath. If desired, the cross-sectional area of the chambers may be made smaller than that of the cells to further confine the ionic discharges from the Y wires to relatively small areas centered over each cell. When these chambers have this rather small cross-sectional area an ionic discharge over one cell has relatively little influence on the balls in neighboring cells. Preferably the chambers should be oblong in cross-section with the centers of the oblongs positioned directly over the centers of the honeycomb cells and with the long axis of the oblongs coinciding with the Y wires. In addition, the oblongs should be long enough to span the two perforations in the portion of the cover sheet over each cell. By thus restricting the size and shape of the chambers it is possible to confine the ionic discharges occurring from the Y wires to those areas over each cell where the presence of electric charges will be most effective. The remaining areas over and adjacent each cell will be relatively free of any electric charges, which if present could adversely influence the motions of the balls in neighboring cells.

The third cell 40$d$ in FIG. 2 shows the conditions within a cell a fraction of a second after the wire $Yc$ over the cell has been pulsed with a strong positive voltage pulse simultaneously with the pulsing of the wire $Xd$ at the bottom of the cell with a strong negative voltage pulse. Because of the strong generally vertical electric fields existing in the third cell at the time of pulsing, the portion of the wire $Yc$ that is over the cell discharges a corona current of positive ions. These ions fall within the chamber 45$d$ around the wire as shown, but in addition some of the ions flow through the two perforations 47 in the cover sheet 42 into the cell 40$d$ and deposit on the sides of the cell's walls 48. If the ball is electrically conductive there will be but very little, if any, corona emitted by the wire $Xd$ during the instant of pulsing because the electric fields within the cell will principally extend from the wire $Yc$ down to the upper surface of the conducting ball rather than to the wire $Xd$. If the ball is not of electrically conductive material or is only of partially conductive material or if the wire $Xd$ does not contact the ball when in its bottom position then there will be a considerable corona current emitted by the wire $Xd$ at the moment of pulsing. Thus, the ball 14 becomes negatively charged either because of negative corona ions emitted by the X wire or because of induced negative charges that flow from the X wire directly to the ball. A fraction of a second after a voltage pulse is applied, the negatively charged ball moves towards the positive charges adhering around the upper portions of the cell 40d and on the cover sheet 42 over the cell.

In the remaining cells 40b, 40c, and 40e the balls remain in their lower positions as shown in FIG. 2 even though the balls may lie directly over or under a pulsed X or Y wire. This is because the pulsing of only one of the wires of a cell does not create the strong electric fields required to produce the relatively large deposits of electrical charges that are necessary to lift a ball upward to its top position in its cell. It is only in that particular cell lying at the crossover point of a pulsed X and Y wire that the deposited charges are strong enough to cause the ball in the cell to move to its upper position. The ball in its raised position in the cell 40d can be returned to its original lower position by giving the cell's X and Y wires, Xd and Yα respectively, a mild reverse polarity voltage pulse. That is, the cell's X wire is given a mild positive pulse while simultaneously the cell's Y wire is given a mild negative voltage pulse. With this mild pulsing, negative corona ions flow from the Y wire and neutralize or slightly over neutralize the positive charges on the walls 48 and cover sheet 42 of the cell 40d. A few positive corona ions will in general also flow from the X wire. These ions tend to neutralize any negative charges on the lower surfaces of the cell 40d adjacent the X wire. Only at the crossover point of a reverse pulsed X and Y wire will the electric fields be sufficiently strong to cause the necessary neutralization of charge on the cell's surfaces to occur, and thus to permit a ball in its upper position to drop back to its original position.

It is desirable that the charge receiving cover sheet 42 over a cell be not completely solid but that there exist in it some perforations, with the perforations preferably positioned towards the sides of the cell walls. When a ball is pulled to its upper position some of the negative electric charge on the ball will tend to leak off to the underside of the cover sheet. If the ball is repeatedly cycled between its lower and upper positions enough negative charge will often accumulate on the underside of the cover sheet to effectively shield the ball from the positive charges on the upper side of the cover sheet and render any further cyclings of the ball impossible. The ball simply ceases to respond to the voltage pulses on its X and Y wires. However, when perforations are present in the cover sheet 42, ions from a pulsed Y wire can flow around through the perforations 47 to the underside of the cover sheet 42 and thus, to a large degree, neutralize the undesirable accumulations of opposite polarity charges on the underside of the cover sheet. The presence of these perforations prevents any excessive build-up of charges on the underside of the cover sheet 42 and other areas within the cell. One of the very desirable features of the design of FIG. 2 is that all the inside surfaces of the cells—both the surfaces above the ball and the surfaces below the ball can be regularly flushed out with ions during each cycling operation of the ball.

The charge receiving cover sheet 42 over the cells 40 (b–e) may be a fine, evenly meshed plastic screen. However, there are advantages in having the perforations in the cover sheet positioned only at the two sides of the cells with the portion of the cover sheet adjacent the central axes of the cells being solid as shown. In this way when a charged ball is pulled up to an oppositely charged cover sheet the charges on the ball can not easily spark over to the opposite polarity charges on the cover sheet or to the Y wire itself. If the central areas of a cell's cover sheet were not solid, but were perforated as in a fine screen then there would be a very short air path between the top of the ball and the Y wire or the charges on the cover sheet directly below the Y wire and sparking would take place between the top of the ball and these charges. If the perforations in the cover sheet are positioned towards the sides of the cell walls 48, as shown, then the air path from the top of the ball to the charges on the cover sheet and also to the Y wire are relatively long and not much of the ball's charge, if any, is lost by sparking.

This preference for using a perforated cover sheet 42 on the uphill side of a matrix of cells applies not only to those matrices that are activated by crossed X and Y signals wires, but also to the matrices that are activated by a scanning bank of discharge electrodes, as discussed in my copending application previously cited herein.

The chambers 45 over each cell are quite important. For a corona discharge to occur from a wire it is necessary to have an air space around the wire. The chambers 45 provide that air space. In addition the walls of the chamber provide deposition areas for the ions from the corona discharges. It is from these charged areas that electric field lines originate and extend down to the ball. If the charged areas are too small because of an inadequate cavity size, then there will be too few electric field lines extending down to the ball to cause it to move. On the other hand, the chamber, and thereby the charged surfaces therein, must not be so extensive as to permit the electric field lines originating therefrom to reach down not only to the ball beneath, but to the neighboring balls as well. Although the Y wire in FIG. 2 is shown as being nearly midway between the upper surface of the cover sheet 42 and the lower surface of the outer cover plate 43, the Y wires may be positioned flush against the cover sheet 42 or flush with the lower surface of the outer plate 43. What is important is that there be adequate space in the chamber either above the Y wire or beneath it. In a few cases the outer plate 43 may be lowered so that the Y wires are compressed between plate 43 and cover sheet 42. If this is done, the perforations in the cover sheet and the upper portions of the cells beneath provide the free air spaces for the Y wires to discharge their corona ions. However, it is in general much more effective to provide a chamber 45 above each cell to serve as a depository for the corona ions.

FIG. 3 is a top view of the matrix of FIG. 2. It shows a square array of round honeycomb cells with each cell bisected by an X wire and a Y wire. The X wires and Y wires are at right angles to each other. If the cells 40 were arranged in a hexagonal array instead of a square array, then in order to have each cell bisected by an X wire and a Y wire the X wires would be positioned at a 60° angle with respect to the Y wires. The perforations in the cover sheet 42 are shown as round apertures on either side of the cells. Although the X and Y electrical conductors are spoken of as "wires" other types of long narrow electrical conductors may of course be used. For example, if the lower transparent plate 41 were engraved with a parallel array of thin grooves and the grooves filled with a silver or other conducting paint then these electrically conductive grooves would become the X signal wires.

FIG. 4 is a type of display panel intended to be vertically mounted. The panel 50 contains an array of honeycomb cells, somewhat similar to the honeycomb structure of the panel depicted in FIG. 2. In FIG. 4, cells 51b, 51c and 51d are shown in cross-section and have a downward slope away from a charge receiving cover sheet 52 so that gravity aids the balls 62, 63 and 64 in returning to lower positions at the right side of the honeycomb cells. X wires (b to d are shown) extend through horizontal grooves engraved in a transparent, electrically insulative plate 61. The grooves are filled with an electrically conductive paint, for example, to form the X wires. The insulative charge receiving sheet 52 covers the cells on their left side. This cover sheet may be perforated with fine or large perforations as discussed in connection with the display panel of FIG. 2. Spaced from cover sheet 52 by insulative spacing members 53 are the Y wires, one of which, Ya, is shown, at right angles to the X wires. It should be evident from the preceding description that there is one Y wire for each vertical row of cells. An insulative outer cover plate 65 is placed adjacent the Y wires. The Y wires such as Ya may be engraved directly in the outer cover plate 65. The cavities 54 formed by spacing members 53, cover sheet 52 and outer cover plate 65 are to the left of the honeycomb cells and form charge deposition chambers 54 which receive and retain the charges emitted by the Y wire. If the Y wires were completely encased in an insulative plastic they could not discharge ions. As previously stated, free air spaces around the Y wires are necessary for an electrical discharge to take place from the Y wires and these air chambers should be carefully located just to the left of the cells.

Conditions within a cell a short time after the cell's X and Y wires have been pulsed with a negative and positive voltage pulse respectively are shown in the two cells 51b and 51c of FIG. 4. Negative charges have been deposited adjacent the two X wires Xb and Xc and positive charges from the wire Ya have been deposited in the two chambers 54 at the left of the two cells 51b and 51c. The balls 62 and 63 having been charged negatively by the negative charges emitted by the two X wires Xb and Xb have been pulled uphill toward the positive charges in the chambers 54. These two balls 62 and 63 are returned to their original right hand positions by applying mild reverse polarity voltage pulses to the appropriate X and Y wires. The Y wires, such as Ya to the left of the cover sheet may, of course, be horizontal and the X wires, such as X(b–d), to the right of the cells vertical, but there is some advantage in having the wires oriented as in FIG. 4. Since the X wires X(b–d) in FIG. 4 are at the upper right-hand edge of the cells they tend to be approximately directly opposite the chambers at the left hand faces of the cells so that when an X and Y wire are simultaneously pulsed only that particular chamber which is opposite the pulsed X wire will receive electrical charges from the Y wire. Adjacent chambers, being too far removed from the pulsed X wire, tend to remain free of any ionic discharges, as is desired. There is another advantage in having the X wires located at the corners of the cells when the balls used are at least partially electrically conducting. At these corners the X wires do not contact the balls when the balls are in their right hand positions. A ball in this right hand position can become charged by the X wire of the cell containing the ball only if the electric fields between the cell's X and Y wires are strong enough to cause the X wire to copiously emit ions and to thereby charge the ball. This further tends to increase the resolution of the system because, since only one ball is substantially charged, only one ball can be drawn uphill to the opposite polarity charges on the cover sheet. When the balls make direct contact with the X wires as in the embodiment of FIG. 2, the charges within one of the chambers around a Y wire can, if unusually strong, pull several balls up toward the charged chamber. This undesirable operation is made more unlikely to occur if the X wires are positioned off center as in FIG. 4, or in some other position where they cannot make good contact with the ball. This again is for the case where the balls used are either electrically conductive or semi-conductive.

In my patent application #103,938, cited supra, there are outlined several methods by which an electrostatically controlled ball shuttling back and forth within a cell can be made to turn a light beam on and off. These methods may all be adapted to the panel embodiments of FIGS. 2 and 4 herein described. For example, the balls in FIGS. 2 and 4 can be made to control either the reflection or transmission of light. In the latter case, if opaque balls are used, the cells may be designed with a conical instead of cylindrical shape. As another technique, one side of a transparent honeycomb sheet is blackened so that an opaque ball in one of the cells of the honeycomb sheet essentially seals the cell to the passage of light when the ball is located in its "off" position near the blackened side of the honeycomb sheet and opens the cell to the passage of light when the ball is located near the unblackened side of the honeycomb sheet. Another variation in design is to use polished clear glass balls that focus parallel beams of light onto small transparent apertures carefully located in a black mask on the viewing side of the panel.

A panel comprising a matrix of clear polished glass balls may be adapted for use in a light projection system in which an illuminated display is projected through a projection lens onto a viewing screen, as depicted in FIG. 5. The panel of FIG. 2 may be utilized for this purpose. When so used, the cover sheet 42 is preferably composed of a milky white plastic having a high coefficient of reflection. The balls in the cells are polished and composed of a clear transparent glass having a suitable index of refraction so as to function as small spherical lenses. The side walls of the cells of the panel may be blackened. Then, if the panel is evenly illuminated from its underside, as in FIG. 5, by parallel bundles of light rays the balls of the panel that are in their upper "on" position will focus these rays on the surface of the white cover sheet. These focused pinpoints of light on the cover sheet will upon reflection re-enter the balls and emerge from the underside of the balls as generally parallel bundles of rays that retrace the path taken by the original incident rays. When the balls are in their lower position in the cells the incident parallel bundles or rays striking the balls will, after passing through the balls, fall upon the white plastic cover sheet as large defocused, diffuse spots. Upon reflection from the white plastic this light will emerge from the underside of the balls as diffuse, widely diverging rays.

In the arrangement of FIG. 5, the panel 2 is evenly illuminated by a small, very high intensity lamp or other strong source of illumination 22. A reflector 23 behind the lamp directs the light from the lamp toward the panel. A large diameter projection lens 24 is disposed below the reflector. The rays passing through projection lens 24 are incident upon a mirror 25 set at an angle such as to reflect the rays upon a viewing screen 26. An opaque support 27 extends about the projection lens to mask the light not passing through the lens.

Electrical signals fed to X and Y wires of panel 2 selectively cause the individual balls in the panel to be attracted upward or to drop down to produce the desired pattern of raised and lowered balls. Illumination falling on the panel from the light source 22 is strongly reflected back toward the projection lens 24 in concentrated rays at those areas of the panel where the balls are in their upper "on" position. At the remaining areas of the panel where the balls are in their lower "off" position the light reflected back from the panel is diffuse so that practically none of the light is intercepted by the projection lens 24. The light from the panel that is intercepted by lens 24 is focused by the lens onto screen 26. Where the screen is at right angls to the panel, a 45° mirror 25 may be employed just below the lens to direct the light toward the screen. Should the rays of light reflected from an area of the panel where the balls are in their "on" position exactly retrace the path taken by the incident rays, this reflected light would all strike the lamp and reflector and no light would remain to pass through the projection lens. The panel ought to be designed so that in the "on" position the balls do not perfectly focus the incident light upon the white cover sheet wherefore, the bundles of light rays reflected from these "on" areas will be slightly divergent. Ideally, the bundle of rays reflected from each "on" area should just fill the pupil of the projection lens. This ideal arrangement is illustrated in FIG. 5 by the beam of light from source 22 which impinges upon an "on" area 29 of the panel 2 and is reflected as a slightly divergent beam to projection lens 24, the divergence being such as to just fill the pupil of the lens. Although the source of illumination of the system of FIG. 5 is shown positioned just above the center of the projection lens, it may be positioned just to the side of the lens. The bundles of light rays reflected from the "on" areas of the panel should again have just enough divergence to be intercepted by the lens.

The focusing action of the balls in the panel depends upon several factors. One factor is the index of refraction of the glass balls and another is the distance between the white cover sheet and the balls in their "on" and their "off" positions. These distances can be varied by employing appropriate mechanical stops to limit the movement of the balls within their cells. For example, a thin, polished transparent sheet may be cemented to the underside of the white cover sheet so that balls with a low index of refraction will when in their upper "on" position still be able to focus the incident parallel light rays on the white reflective surface of the cover sheet.

While it is preferable to have the upper position of the balls as their "on" position, this need not necessarily be the case for it is possible to arrange the panel so that the "on" position is the lower position of the ball. What is required is that the balls when in their "on" position bring the incident light rays to a focus at the reflective surface of the cover sheet.

A modified panel 30 intended for horizontal mounting is shown in FIG. 5a. The panel of FIG. 5a comprises a matrix of honeycomb cells 40b, 40c, 40d, in which repose highly reflective balls 31, 32, and 33, respectively. Preferably, the balls are polished metallic balls but they may be polished, white opal glass or plastic balls. Over the top of the cells is a charge receiving cover sheet 34 and over this an array of parallel Y wires one of which, Ya, is shown. The Y wires are separated from the charge receiving cover sheet 34 by spacing elements 38. An outer cover plate 39 is placed over the Y wires. A pair of stops 35 within each cell determines the lower position of the ball within the cell. An X wire, such as Xb, Xc, or Xd, passes through each cell preferably at about the same height in the cell as the stops 35. The matrix of cells is closed on its lower side by a transparent glass or plastic plate 37 that is lenticulated. Plate 37, essentially, is a square array of lenses with each lens abutting its neighboring lens, such that under each honeycomb cell there is a lens having its axis approximately coinciding with the axis of the cell where the FIG. 5a panel is used in the projection system of FIG. 5. The light emitted by source 22 is incident upon the underside of the lenticulated plate 37 as indicated by the rays in FIG. 5a. The bundle of rays striking a lens comes to a focus within the cell at a point that coincides with the undersurface of the ball with the ball in its lower position against the stops as shown in cell 40c in FIG. 5a. This light is reflected from the surface of the ball to approximately retrace the path taken by the incident rays. With the ball in its upper position, as shown in cells 40b and 40d, the light entering the cell is scattered about and absorbed within the cell; the remnant of light that does leave the cell through the lens of plate 37 is so divergent that very little of it is incident on projection lens 24.

It should be noted that there is more than one position of the ball within its cell which will cause the incident bundle of rays entering the cell to be reflected directly back along the incident path of the rays. Where the center of the ball, for example, coincides with the virtual focal point of the bundle of rays entering the cell, these rays strike the ball perpendicular to its surface and assuming that surface to be a specularly reflecting one, the reflected rays retrace downwardly the upward path of the incident rays. In the drawing of FIG. 5a this condition could be made to occur if the stops were removed and the X wires Xb, Xc, Xd were located at the bottom of the cells 40b, 40c, 40d against the lenticulated plate 37. The balls, then, in their lower position would be resting on the lenticulated plate. In this position, the incident light strikes the balls approximately normal to the balls' surfaces.

Light rays from lamp 22 falling on the panel are parallel to the optic axes of the lenses of the lenticulated plate 37 only if the panel has a slight spherical curvature with the lamp being the center of the spherical surface. If the panel is flat, as it is illustrated to be in FIG. 5, then the light rays striking the outer areas of the panel are not perpendicular to the broad surface of the panel. To compensate for the oblique angle which the incident light rays make with the panel, the lenses in the lenticulated plate should be made slightly smaller in diameter than the diameter of the cells of the panel so that at the outer areas of the panel the optic axes of the lenses are slightly displaced from the axes of the cells. When the displacement is of the correct amount, the rays of light passing through the outer lenses continue to be properly focused on the balls when these balls are in their lower "on" positions and the rays of light reflected by these balls retrace the paths made by the incident rays.

By using a panel of electrically controlled balls in the projection system of FIG. 5, intensely brilliant displays with a very high degree of contrast between the light and dark areas can be projected on a large viewing screen. One of the unique features of this projection system is its nondependence on any kind of lens or reflector to condense the light from the light source 22 onto the surface of panel 2. The luminous efficiency of any projection system using condensing lenses or reflectors is always low. The reflector 23 in FIG. 5 reflects light from the lamp 22 towards the panel 8 in a divergent path. No attempt is made to condense the light emitted by the lamp into a narrow beam.

In the display panels so far discussed, whether in this application or in my copending application #103,938, electrostatic forces were used exclusively to control the positions of the movable shutter elements. These same display systems may in general be easily adapted to the use of magnetic forces in conjunction with electrostatic forces to control the positions of the shutter elements. For example, where the Y wires of FIG. 2 or 4 herein are of steel or other magnetic material and the balls are also of steel or other magnetic material and where, either the balls or the wires are permanently magnetized, then when a ball is pulled up to cover sheet 42 through the action of the electrostatic forces between the ball and the cover sheet, the ball tends to remain against the cover sheet even though the electrostatic charges on the cover sheet and the ball have leaked away. Once the ball moves into close proximity to the wire, the magnetic attractive forces between the wire and ball become strong enough to hold the ball against the cover sheet without the aid of electrical forces. To aid in this magnetic attraction, particles of magnetic material (viz., iron, steel, or magnetic oxide of iron) may be embedded in the cover sheet or the plate behind the cover sheet. The elements of the panel that are permanently magnetized such as the balls, the Y wires or the cover sheet should preferably be magnetized at the time of fabrication of the panel. In imparting this permanent magnetism care should be taken to produce north poles that are closely spaced from the south poles so that the resultant magnetic fields will be localized and not extend too far from the magnetized element. In general the Y wires should be the permanent magnetic elements since they are the easiest to magnetize. When a ball, such as the ball 14 in FIG. 2, is in its upper position and being held there by the magnetic field at wire Ya, the ball can be returned to its lower position by simply pulsing the cell's X and Y wires as before. Ions emitted by wire Ya charge both the cover sheet 42 and the ball 14 and repel the ball away from the cover sheet with a force strong enough to overcome the magnetic forces between the ball and its Y wire. Once the ball 14 is in its lower position the magnetic forces between the ball and its Y wire are too weak to pull the ball back up again. When magnetic forces are utilized the cover sheet 42 should preferably contain many small perforations so that the ball may readily be charged by the ionic discharge from its Y wire.

Among the advantages of employing magnetic forces is that when such forces are used the interior of the honeycomb cells need not be highly electrically insulative since the electrostatic charge is not required to be retained for extensive periods. The cover sheet need not be so precisely made as in the case when only electrostatic forces are employed. When magnetic forces are used, the thickness of the cover sheet and the size and locations of its perforations are not critical. If after a ball has been electrically pulled upward to the cover sheet, a spark should jump from the ball through the perforations in the cover sheet to the Y wire or to the electrical charges adjacent the wire thereby discharging the ball, the ball being magnetically held against the cover sheet cannot fall down again.

Another advantage obtained by the use of magnetic forces is that they permit the use of a simplified signaling system which allows the use of unipolar voltage pulses on each set of X or Y wires irrespective of whether the pulses are used for writing or erasing. Where the simplified signalling system is employed, the honeycomb cells of the panel are constructed with walls that are electrically semi-conductive (a semi-conductive paint or spray may be applied for this purpose) so as to dissipate electrical charges within a time interval of several seconds or less. Then, for example, if a negative voltage pulse is applied to a Y wire and simultaneously a positive voltage pulse is applied to an X wire, the ball in the cell located at the crossover point of the pulsed wires is caused to rise to its upper position. The charges within the cell now leak away and disappear (either by neutralizing each other or by flowing back to the wires) but the ball remains in its upper position because of its magnetic attraction toward the cover sheet. If now the Y wire above the ball is given another negative pulse and the X wire beneath the ball another positive pulse, the ball returns again to its lower position.

The X wires may be composed of a somewhat larger diameter wire than the Y wires to reduce the strength of the corona discharge from the X wires. In addition the X wires may be partially coated with a varnish to further reduce the corona currents therefrom. In general it is the Y wires at the upper side of the cells that one desires to be copious ion emitters and not the X wires at the lower side of the cells.

If the various surfaces of a cell that receive electric charges, such as the cell's cover sheet, are only semi-insulative they should at least be sufficiently insulative to retain the charges deposited on them for a long enough time to allow the electric fields of force flowing from the charges to impart to the ball in the cell enough momentum to carry it over to its new position in the cell, i.e., from its "off" to its "on" position or vice versa. This surface insulation may be even further reduced if the electrical signals fed into the display panel are repetitively reprogramed at a rapid rate. However, this rapid reprograming adds a considerable burden to the signaling system and in most cases is considerably less desirable than a memory type of display system in which a single deposition of a writing charge at a given point on the panel causes the ball at that point to move from its "off" to its "on" position and to remain in its new position until an erasing signal is received.

The X wires (or the plate behind the X wires) may also be of magnetic material and be magnetized. If this is done then the downward slope of the cells toward the X wires as in FIG. 4 may be made much more gentle since the force of gravity is now not so important as before in holding a ball in its right hand position in its cell. With the proper use of magnetic forces the cells of a panel can in some cases even be designed to be absolutely horizontal.

In addition to building the cells of a panel with a downhill or uphill slope or with no slope at all the cells can be designed with a gradient that varies from the front to the rear of the cell. For example, the axes of the cells $51b$, $51c$, $51d$ of FIG. 4 may be curved so that the cells slope down to the right and also down to the left with the highest point of the cells being midway between the transparent plate 61 on the right and the cover sheet 52 on the left. In this way gravity locks a ball in either its right hand or left hand position. The deposition of electric charges by the signal wires will move a ball from one position to another, but in the absence of these signals the ball will remain indefinitely in the last position in which it was left by the signal charges.

The advantages of employing magnetic forces apply not only to panels powered by an orthogonal set of signal wires but also to panels that receive their writing and erasing charges from a scanning bank of electrodes mounted on a moving carriage. In this latter case the cover sheet should be impregnated with magnetic particles and either the cover sheet or balls permanently magnetized. Then a single bank of electrodes that emits, say, only negative charges may be employed for both writing and erasing.

Another alternative procedure is to employ, principally for erasing purposes, a bank of signal modulated electromagnets mounted on a moving carriage that is designed to traverse the rear face of the display panel in a scanning motion. Then if the cover sheet has been impregnated with magnetic particles that have preferably been permanently magnetized at the time of fabrication of the cover sheet the scanning electromagnets may be used to pull magnetic balls or other magnetic shutter elements toward the cover sheet. The magnetic attraction between the balls and the cover sheet then holds the balls in this rear position. Although it is usually desirable to have either the cover sheet or the balls permanently magnetized, this is not a necessary condition. The scanning electromagnets if strongly excited can strongly magnetize the cover sheet and/or the balls and this magnetism will remain for a sufficiently long time to permit satisfactory displays to be made. Even if the cover sheet does not contain any magnetizable material, a shutter ball or powder if pulled against a simple plastic cover sheet by an external magnet such as a scanning electromagnet will remain against the cover sheet if there are other attractive forces involved, such as gravity. The balls can be pushed away from the cover sheet by a deposition of electric charges onto the cover sheet by either a scanning bank of signal controlled discharge electrodes or by pulsed Y wires. The cover sheet should, of course, be perforated to permit the electric charges deposited thereon to also charge the balls behind the cover sheet. The cover sheet should preferably be on the uphill side of the balls (or other shutter elements) so that when the balls are released by the deposition of electric charges the balls will roll or fall downhill. Although a high degree of resolution is required in the writing of information on a display panel this same high degree of resolution is often not required in the erasing process. For example, a bank of only fifty signal modulated electromagnets in a scanning bank of electromagnets may be ample for erasing purposes while a bank of at least 500 to 1000 signal controlled corona discharge electrodes are usually required to write with. Thus, signal controlled electromagnets can be a useful and practical addition to a normally electrostatically operated display panel. It might be noted that a magnetizable ball in a cell covered by a magnetizable cover sheet may be shuttered to both an "on" position and an "off" position by magnetic signal forces such as might flow from the tip of a scanning electromagnet. The direction of flow of the signal current in the electromagnet determines whether the area of the cover sheet beneath the electromagnet was being magnetized or demagnetized. However, it is usually much simpler and more practical to at least "write" with electrostatic charges deposited by ion discharge electrodes. It should also be noted that whether one employs magnetic or electrostatic forces, the individual cells of a panel may contain more than one ball. In fact, fine powders, especially magnetic powders, may be usefully employed in the cells of a panel, particularly if the cells are small.

Figure 6:
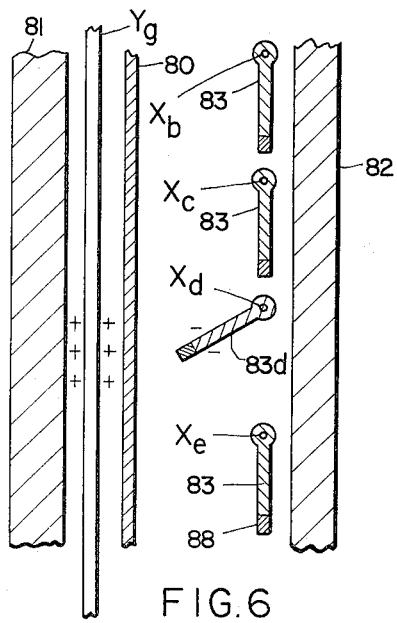
FIG. 6 is a cross-sectional view of a display panel employing hinged flaps as shutter elements.
Figure 8:
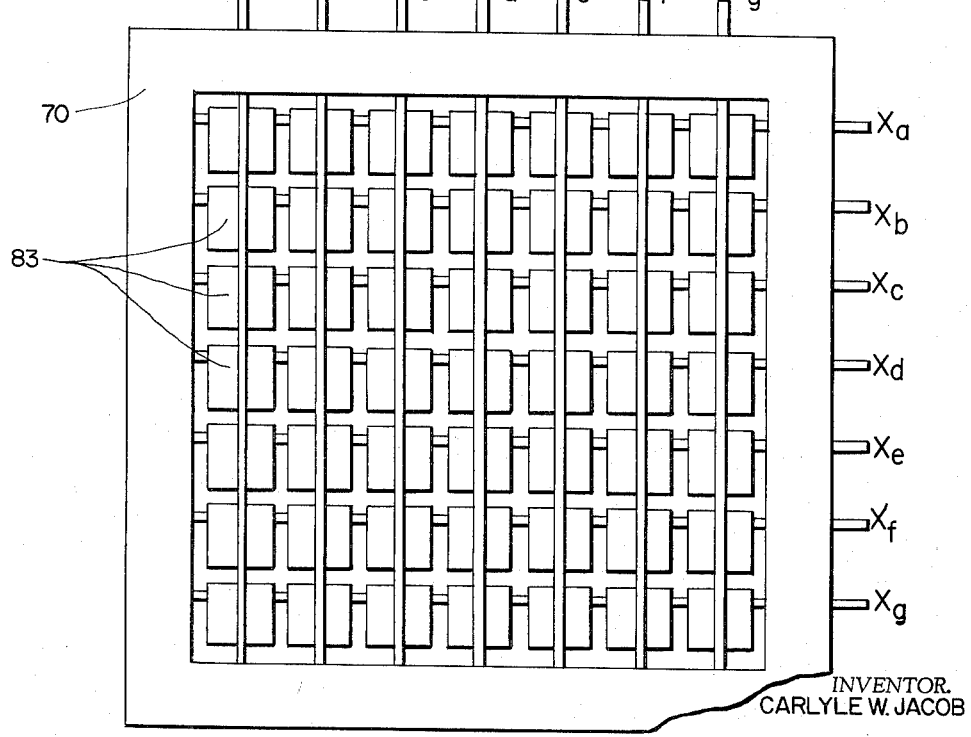
FIG. 8 illustrates the frontal appearance of the display panel of FIG. 6 with the X and Y wires greatly exaggerated in size.

FIG. 8 is a view of a display panel in which the moving elements are hinged flaps 83 instead of balls as in the embodiments of FIGS. 2, 4, and 5a. The degree of rotation of these flaps about their axis is controlled by an orthogonal set of X and Y signal wires X ($a$–$g$) and Y ($a$–$g$), respectively. FIG. 6 is a side view of the panel of FIG. 8. The flaps, as indicated in FIG. 6, are strung on the X wires so that the X wires serve both as a hinge for the flaps and as a signal wire. The X and Y wires are stretched between a suitable insulative frame 70 for support. While the flaps are designated generally by the numeral 83, the relationship between an individual flap and its associated X and Y wires is indicated by using the same suffix, i.e., $a$ through $e$, for the flap and its associated wires. The flaps are of electrically conductive material like aluminum and have long cylindrical holes in their upper ends through which the X wires pass. Vertical Y wires, one of which, $Yg$, is shown, are positioned between a charge receiving insulative cover sheet 80 and an outside insulative cover plate 81. The Y wires may be positioned against the cover sheet or against the outside cover plate or at any intervening point between the two. A protective plate 82 to the right of the flaps permits the interior of the panel to be sealed against the outside atmosphere. These various plates and cover sheets may be made transparent to permit an observer to see the flaps with reflected or transmitted light. The flaps are pulled toward the cover sheet by electrostatic charges on the cover sheet 80. If a Y wire such as $Yg$ is given a strong positive voltage pulse at the same instant that an X wire such as $Xd$ is given a strong negative voltage pulse, then at the crossover point of the pulsed X and Y wires the Y wire discharges positive charges which deposit on the cover sheet 80 and outside cover plate 81, and the charge remains there. These positive charges induce negative charges in the flap that is directly opposite the positive charges, i.e., the flap 83$d$, and this flap is drawn toward the positive charges. The tips of the flaps are, preferably, coated with an insulative varnish or plastic 88 to prevent sparking between the tips of the flaps and the cover sheet or between neighboring flaps. The main body of the flaps 83 instead of being composed of a material that is a good electrical conductor, like aluminum, may be composed of a material that is only slightly electrically conductive, like glass, particularly if the glass is slightly damp. Where a semi-conductive material is used, the insulative plastic tips 88 are optional. Assuming flaps 83 to be composed of glass or another semi-conductive material, when wire $Yg$ is given a positive voltage pulse and wire $Xd$ is simultaneously pulsed with a negative voltage, the wire $Yg$ emits positive charges which deposit on cover sheet 80 as shown. During this brief pulse period, which may be less than a millisecond, negative charges from wire $Xd$ do not have time to flow down flap 83$d$ and spark over to wire $Xe$, or to spark over to wire $Xc$ via the flap on wire $Xc$ because the current flow in the flaps, due to the flaps' high electrical resistivity, is very feeble. However, even with this feeble flow of current enough induced negative charges flow from wire $Xd$ along the flap 83$d$ to cause this flap to be attracted to and to slowly swing toward the positive charges on the cover sheet 80. Within a period of one or more seconds the flap 83$d$ swings out all the way toward the positive charges on the cover sheet 88 as shown. A time delay of one or a few seconds between the reception of a voltage pulse and the movement of a flap is usually not objectionable since an observer viewing a display panel does not often mind waiting several seconds for a pattern to be formed on the panel.

Figure 7:
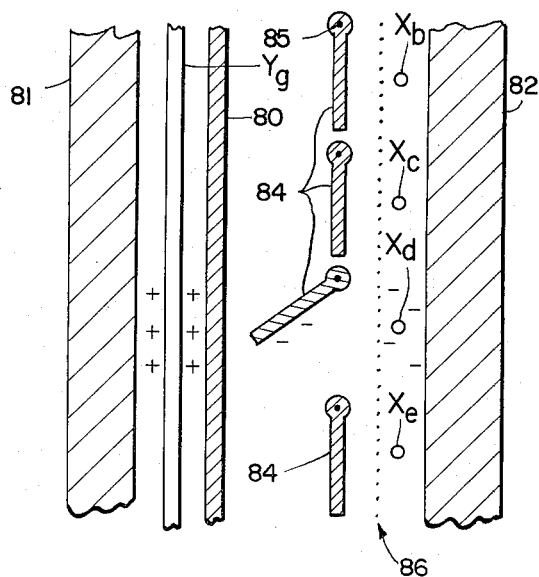
FIG. 7 is a modification of the display panel depicted in FIG. 6.

FIG. 7 shows a modification of the FIG. 6 construction, parts which are common to both constructions being designated by the same reference number. The flaps 84 in FIG. 7 are composed of an electrically insulative material and are loosely hung on plastic or other insulative wires 85. The X wires X ($b$–$e$) are located to the right of the flaps with one X wire behind each horizontal row of flaps. There is preferably located between the flaps and the X wires an electrically insulative plastic charge receiving screen 86. The screen is, preferably, stretched between supports to keep the screen taut. A glass or plastic cover plate 82 to the right of the X wires serves as a shield and charge receiving surface for the corona discharging X wires. The Y wires, only $Yg$ is shown, are positioned to the left of the flaps between cover sheet 80 and outside cover plate 81. Assuming an X wire is pulsed with a negative voltage pulse at the same instant that a Y wire receives a positive voltage pulse, at the crossover point the X wire discharges negative ions and the Y wire discharges positive ions. The third flap down in FIG. 7 shows conditions at a pulsed crossover point shortly after the pulsing took place. Positive charges were deposited on the insulative surfaces around the Y wire, $Yg$, and negative charges around the insulative surfaces around the X wire, $Xd$. In addition, negative charges from the X wire, $Xd$, have passed through the screen 86 and deposited on the surface of the adjoining flap. This negatively charged flap being attracted to the positive charges around the Y wire, $Yg$, swings to the left. It is only at this pulsed crossover region that positive and negative charges are deposited in substantial numbers, and thus, only the third flap down swings out appreciably toward the left. If the X and Y wires at this crossover point are thereafter given mild reverse voltage pulses, the third flap returns to its neutral vertical position.

Figure 9:
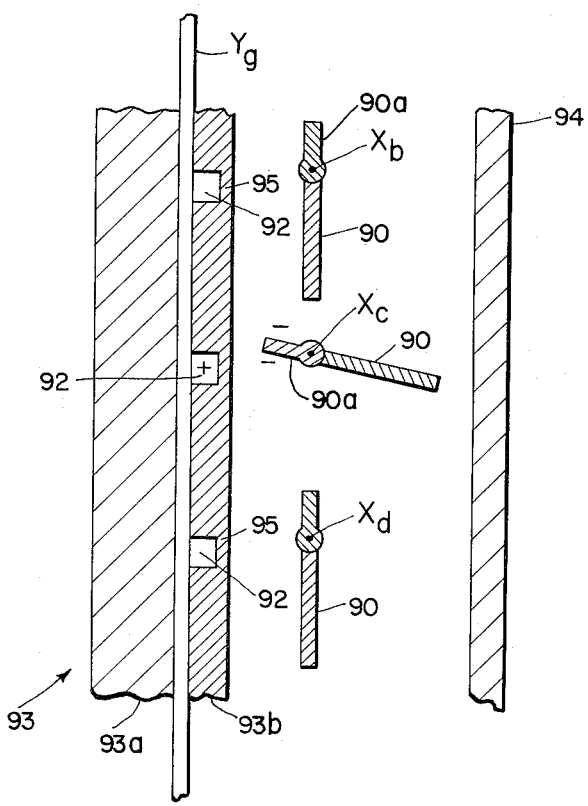
FIG. 9 is a cross-sectional view of a display panel species employing hinged flaps.

FIG. 9 shows an enlarged side view of a section of a different embodiment of a display panel employing flaps. Three flaps 90 are shown mounted on horizontal X wires X ($b$–$d$). The wires pass through small holes in the flaps and the fit is made loose enough to permit the flaps to hang freely like a pendulum. The lower portion of each flap below the wire is longer and heavier than the upper portion of the flap above the wire so that the flap normally hangs in a vertical position. The upper portion of the flap 90$a$ is metallic so as to acquire the same potential as the X wire on which it is strung. The upper edges of the flaps are, preferably, coated with electrically insulative varnish or plastic to prevent sparks from jumping off these edges. The lower below wire portion of the flap is composed of an insulative plastic. To the left of each flap is a vertical Y signal wire, $Yg$, encased in a plastic cover plate 93, comprising a left hand portion 93$a$ that bounds the Y wires on their left side, and a right hand portion 93$b$, that bounds the Y wires on their right side. These two portions 93$a$ and 93$b$ may be cemented together. Approximately opposite each X wire, preferably slightly lower than each X wire, is a cavity 92 in the plastic cover plate. The wire $Yg$ passes through one side of this cavity. The cavity functions as a receptacle to catch and hold the ions discharged from the Y wire. Along the remaining portions of the Y wire that are solidly encased in plastic no ionic discharge is possible. When the wire $Yg$ is pulsed with, say, a positive voltage pulse at the same time that an X wire, $Xc$, for example, is pulsed with a negative voltage pulse, then at the crossover point the relatively fine diameter $Yg$ wire discharges positive corona ions into the cavity. These ions induce a negative charge in the upper metallic portion 90$a$ of the flap, thereby causing this upper portion to swing toward the positive charges in the cavity. Since the cavity is positioned slightly below the axis of the flap the flap will swing to an almost horizontal position. If the X and Y wires Xc and Yg are given a mild reverse pulse the positive charges are neutralized and the flap returns to its vertical position.

If the surfaces of the cover plate 93 are made slightly electrically conductive then the positive charges in the cavities slowly leak away and a flap in its horizontal position will slowly return to its vertical position. This is one way of causing the flaps to return to their neutral positions. The flaps can of course be maintained in their horizontal positions by repetitively applying energizing signals to the X and Y wires, say reprogramming the entire board several times a second. The thin right wall 95 of the cavity may be perforated like a screen so that a seepage of electrical charges through this wall can occur, thereby preventing unwanted stray electrical charges from accumulating on the flap side of the cavity wall. For this same purpose the wall at the right in the cavity may be composed of an electrically conductive material. This right cavity wall might, in some cases, be entirely eliminated but preferably there is present some wall even if this wall is merely a few strands of a screening material. The accumulation of unwanted electrical charges on this wall may be further prevented by coating the upper tip edges of the flaps with an insulative varnish or plastic to reduce sparking between the upper portions of the flaps and the cavity wall. A plate 94 preferably composed of transparent glass or plastic is mounted to the right of the matrix of flaps 90 and seals the flaps from the outside atmosphere. There are several important advantages in the construction of the matrix of flaps shown in FIG. 9 over that of FIG. 6. When the flaps are constructed as in FIG. 9, a significant portion of each flap extends above the axis of the flap and another significant portion below the axis of the flap. If only one of these portions (preferably the smaller portion) is influenced by the electric fields of the deposited electric signal charges, the X signal wires X ($a$–$g$) may be positioned much closer to the Y signal wires Y ($a$–$g$) than in the case where practically the entire mass or area of the flap is on one side of the axis of the flap. With the X wires relatively close to the Y wires smaller signal voltages may be employed and even with these smaller signal voltages the electric fields between the flaps and the deposited charges in the cavities surrounding the Y wires Y ($a$–$g$) can still be made greater than is possible in the FIG. 6 design. One difficulty in the use of large signal voltage pulses on the signal wires is the danger of a voltage pulse on one X wire sparking over to an adjacent X wire.

Another advantage obtained by spacing the X wires X ($a$–$g$) close to the Y wires Y ($a$–$g$) for a given size of flap is the increase in the resolving power obtainable. In the FIG. 6 construction, a voltage pulse on a single X wire and a single Y wire can cause several flaps to at least partially deflect. For example, in FIG. 6 the positive charges surrounding the Y wire Yg will cause not only the third flap down 83d to deflect toward the charges, but in addition and to a lesser degree, the second flap down also.

In FIG. 9, the positive charge shown adjacent the Y wire can significantly influence only the second flap down. It might be noted that in the flaps of FIG. 9, the metallic attractable portion of the flaps, as an alternative, may be below the axis rather than above the axis. If the metallic part of the flap is the below axis portion, then it must be heavier than the above axis portion so as to cause the flap to hang properly.

Figure 10:
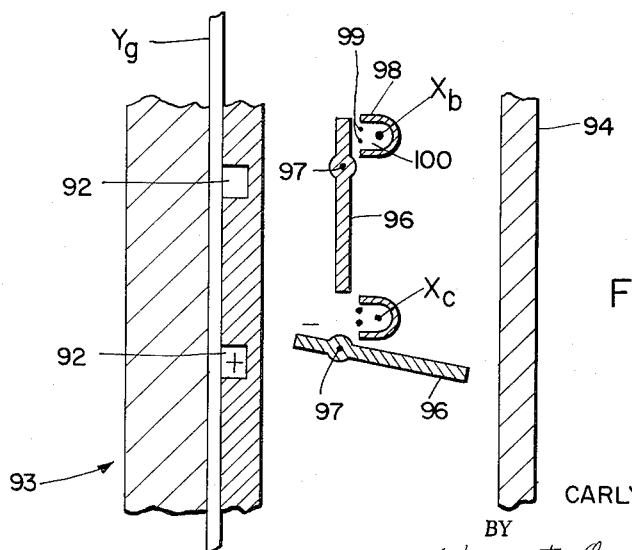
FIG. 10 is another species of a display panel employing hinged flaps.

FIG. 10 shows a construction similar to the embodiment of FIG. 9 except that the entire flap 96 is now composed of an insulative material and the wires 97 on which the flaps are strung are also composed of an insulative material. This insulative material may be a plastic. The electrically conductive X signal wires Xb, Xc are positioned just to the right of the upper portions of the flaps 96. The X wires Xb, Xc are, preferably, enclosed by an insulative protective shield 98 having an insulative screen 99 on the left of the shield. The space inside the shield is an X wire charge reception cavity. The Y wires such as Yg are again encased in an insulative cover sheet with charge reception cavities located opposite the flaps. The flaps are activated as before by simultaneously pulsing the X and Y wires X ($a$–$g$) and Y ($a$–$g$) with opposite polarity voltage pulses. If the X wire Xc receives a negative pulse, for example, then negative corona ions flow from the X wire Xc and deposit on the screen and other walls of the X wire cavity 100. Some of these ions pass through the screen 99 and negatively charge the upper portion of the flap just to the left of the screen. This upper portion of the flap then pivots to the left toward the positive charges in the opposite Y wire cavity, whereby the flap assumes a horizontal position. The flap will remain in this inclined position until the X and Y wires Xc and Yg are given reverse polarity pulses.

What is claimed is:

1. A display system comprising: a display panel having a honeycomb sheet formed by a plurality of cells, an electric charge receiving surface adjacent one end of said cells, a first set of wires adjacent one side of said charge receiving surface, a second set of wires adjacent said charge receiving surface and angularly disposed with respect to said first set of wires, a light controlling shutter in each cell, and means connected to said first and second sets of wires for establishing electric fields therebetween to cause electric charges to be deposited on said charge receiving surface whereby the positions of the light controlling shutters are determined by the deposited charges on said receiving surface.

2. A display system in accordance with claim 1 wherein the means for establishing an electric field between wires of said first and second sets includes a source of electric potential for producing a corona discharge from at least one of the wires between which the field is established.

3. A display system in accordance with claim 1 in which the wires of the first set cross over the wires of the second set, each crossing of the wires being associated with a different cell of the honeycomb sheet, and wherein the means for establishing an electric field includes apparatus for applying pulses of opposite polarity to the crossing wires to cause the shutter in the cell adjacent the crossing to change position.

4. A display system comprising: a display panel having a surface for retaining a pattern of electrical charges, first and second sets of wires, the first set of wires being spaced from and crossing over the second set, the display panel having a matrix of light controlling valves disposed between the first and second sets of wires, means for impressing an electric potential between wires of the first and second sets to cause electric charges to be deposited on the charge retaining surface whereby the positions of the valves are determined by the pattern of deposited charges.

5. A display system in accordance with claim 4 wherein a single valve of the matrix is controlled by the voltage applied to a pair of crossing wires, one of the pair of wires being of the first set and the other being a wire of the second set.

6. A display system in accordance with claim 4 wherein each valve of the matrix is controlled by a corona discharge potential applied between a wire of the first set and a crossing wire of the second set.

7. Apparatus in accordance with claim 4, further characterized in that: each light controlling valve of the matrix comprises a hollow cell housing a movable shutter, the surface for retaining electrical charges is interposed between the first set of wires and the matrix of valves, and said surface is perforated to permit electrical charges given off by wires of the first set to deposit on the interior walls of the cells.

8. Apparatus in accordance with claim 7, further comprising insulative means disposed at one end of the hollow cells and having chambers situated in register with the cells, the wires of the first set extending through the chambers, and each chamber communicating with the cell with which it is in register through the aforesaid perforated surface, whereby the electric charge emitted by a wire in a chamber is confined within the chamber and its associated cell.

9. A display panel comprising:
  means having a surface capable of retaining an electrostatic charge pattern;
  means for depositing electrical charges on said surface comprising first and second sets of wires traversing said surface, the first set of wires being spaced from and crossing over the wires of the second set, electrical charges being deposited on said surface adjacent the crossover of a wire of the first set and a wire of the second set when a high electric potential is established between those wires, and
  a plurality of light controlling valves adjacent said surface, each valve being a shutter which is movable under the influence of an electric field whereby the positions of the shutters are determined by the electric fields associated with the pattern of electrostatic charges.

10. A display panel in accordance with claim 9, wherein the shutters are flaps pivotally supported to swing toward and away from said surface.

11. A display panel in accordance with claim 10 wherein the shutters are pivotally mounted on the wires of the first set and the electrical charges are given off to said surface by wires of the second set.

12. A display panel in accordance with claim 10 further comprising insulative means on which the flaps are pivotally mounted, and one of the aforesaid sets of wires is located adjacent the flaps whereby electric charges given off by the wires of that set deposit on the adjacent flaps.

13. A display system comprising:
  a panel;
  a set of wires disposed on one side of the panel;
  a surface for retaining a pattern of electrical charges on the other side of the panel;
  a second set of wires adjacent the charge retaining surface, the second set of wires being separated from the charge retaining surface by a gaseous discharge space, the second set of wires being angularly disposed to the first set of wires and crossing over the first set;
  means connected to the first and second set of wires for causing an electrical discharge to occur in the gaseous space at a selected crossing of the wires whereby electric charges deposit upon the charge retaining surface adjacent the crossing points;
  and a multitude of light controlling valves in the panel, the light controlling valves adjacent the deposited charges on the charge retaining surface moving under the influence of the deposited charges.

14. A lamellar display panel having:
  a first layer comprising a grid of parallel wires;
  a second layer defining a gaseous discharge space;
  a third layer having a surface for retaining a pattern of electrical charges;
  a fourth layer comprising a multitude of moveable light gating elements, the elements moving in response to the electric fields emanating from electric charges on the retaining surface so that the positions of the elements are determined by the pattern of electrical charges;
  a fifth layer comprising a grid of parallel wires angularly disposed to the wires of the first layer;
  and means for applying an electric potential pulse between a selected wire in the first layer and a selected wire in the fifth layer whereby at the crossover point of the selected wires an electrical discharge occurs in the gaseous discharge space and causes electric charges to deposit on the retaining surface.

15. A display system comprising:
  (1) a display panel having:
    (a) means presenting a surface for retaining a pattern of electrical charges,
    (b) first and second sets of wires, the first set of wires being spaced from and crossing over the second set, and
    (c) a matrix of light controling valves disposed between the first and second set of wires,
  (2) means for impressing an electric potential between wires of the first and second sets to cause electric charges to be deposited on the charge retaining surface whereby the positions of the valves are determined by the pattern of deposited charges;
  (3) a lens;
  (4) a source of light, disposed between the lens and and the display panel, causing the illumination to be directed toward the matrix of light controlling valves;
  (5) and means for projecting the light, reflected from the matrix of valves, which passes through the lens upon a viewing surface.

References Cited by the Examiner

UNITED STATES PATENTS

| | | | |
|---|---|---|---|
| 1,848,888 | 3/32 | Kendall | 178—7.5 |
| 1,984,683 | 12/34 | Jenkins | 178—7.5 |
| 2,025,143 | 12/35 | Zworykin | 178—7.5 |
| 2,058,882 | 10/36 | Ives et al. | 178—6 |

FOREIGN PATENTS

| | | |
|---|---|---|
| 827,960 | 5/38 | France. |
| 48,904 | 9/38 | France. |
| 900,947 | 11/53 | Germany. |

NEIL C. READ, *Primary Examiner.*